(12) United States Patent
Adragna

(10) Patent No.: US 6,552,678 B1
(45) Date of Patent: Apr. 22, 2003

(54) SATELLITE METHOD FOR USING RADAR INTERFEROMETRY TO ESTABLISH A DIGITAL TERRAIN MODEL

(75) Inventor: Frédéric Adragna, Saint-Orens-de-Gameville (FR)

(73) Assignee: Centre National d'Etudes Spatiales (FR)

( * ) Notice: Subject to any disclaimer, the term of this patent is extended or adjusted under 35 U.S.C. 154(b) by 0 days.

(21) Appl. No.: 09/868,114

(22) PCT Filed: Dec. 14, 1999

(86) PCT No.: PCT/FR99/03130

§ 371 (c)(1),
(2), (4) Date: Oct. 19, 2001

(87) PCT Pub. No.: WO00/36434

PCT Pub. Date: Jun. 22, 2000

(30) Foreign Application Priority Data

Dec. 15, 1998 (FR) .............................. 98 15814

(51) Int. Cl.⁷ .............................................. G01S 13/90
(52) U.S. Cl. ............................ 342/25; 342/26; 342/191
(58) Field of Search ............................ 342/25, 26, 59, 342/62, 63, 64, 65, 96, 156, 159, 162, 190, 191, 195, 197, 352

(56) References Cited

U.S. PATENT DOCUMENTS

| | | | | |
|---|---|---|---|---|
| 4,602,257 A | * | 7/1986 | Grisham | 342/25 |
| 4,727,373 A | * | 2/1988 | Hoover | 342/25 |
| 4,975,704 A | * | 12/1990 | Gabriel et al. | 342/25 |
| 5,332,999 A | * | 7/1994 | Prati et al. | 342/25 |
| 5,561,837 A | * | 10/1996 | Muller et al. | 455/13.1 |
| 6,384,766 B1 | * | 5/2002 | Ulander | 342/25 |

OTHER PUBLICATIONS

"A weighted least squares solution for space intersection of spaceborne stereo SAR data", Pu–Huai Chen; Dowman, I.J., Geoscience and Remote Sensing, IEEE Transactions on, Vol.: 39, Issue: 2, Feb. 2001, pp.: 233–240.*

"Engineering considerations pertaining to the use of GPS for single pass satellite SAR interferometer attitude measurement", Malliot, H.A., Aerospace Conference, 1997. Proceedings., IEEE, vol.: 3, 1997, pp.: 103–119 vol. 3.*

"Accuracy of topographic maps derived from ERS–1 interferometric radar", Zebker, H.A.; Werner, C.L.; Rosen, P.A.; Hensley, S Geoscience and Remote Sensing, IEEE Transactions on, vol.: 32, Issue: 4, Jul. 1994, pp.: 823–836.*

H.A. Zebker et al: Mapping The World's Topography Using Tadar Inerferometry: The Topsat Mission; Proceedings Of The IEEE, vol. 82, No. 12, Dec. 1, 1994, pp. 1774–1786, XP000492720; ISSN: 0018–9219.

A. Moccia et al: A Tethered Interferometric Synthetic Aperture Radar (SAR) For A Topographic Mission; IEEE Transactions On Geoscience and Remote Sensing, U.S. IEEE Inc. New York; vol. 30, No. 1; Jan. 1, 1992, pp. 103–109; XP000248539; ISSN: 0196–2892.

* cited by examiner

Primary Examiner—John B. Sotomayor
(74) Attorney, Agent, or Firm—Lerner, David, Littenberg, Krumholz & Mentlik, LLP

(57) ABSTRACT

The invention relates to a method which consists in launching one behind the other on two close orbits two satellites (S1, S2) each equipped with a high-resolution synthetic aperture radar observing the Earth under an angle of incidence of at least 40°, such that the radars observe independently of each other the same strip of terrain, with time interval not more than 10 seconds, preferably of not more than 4 seconds, and preferably not less than 2 seconds between their respective observations.

9 Claims, 1 Drawing Sheet

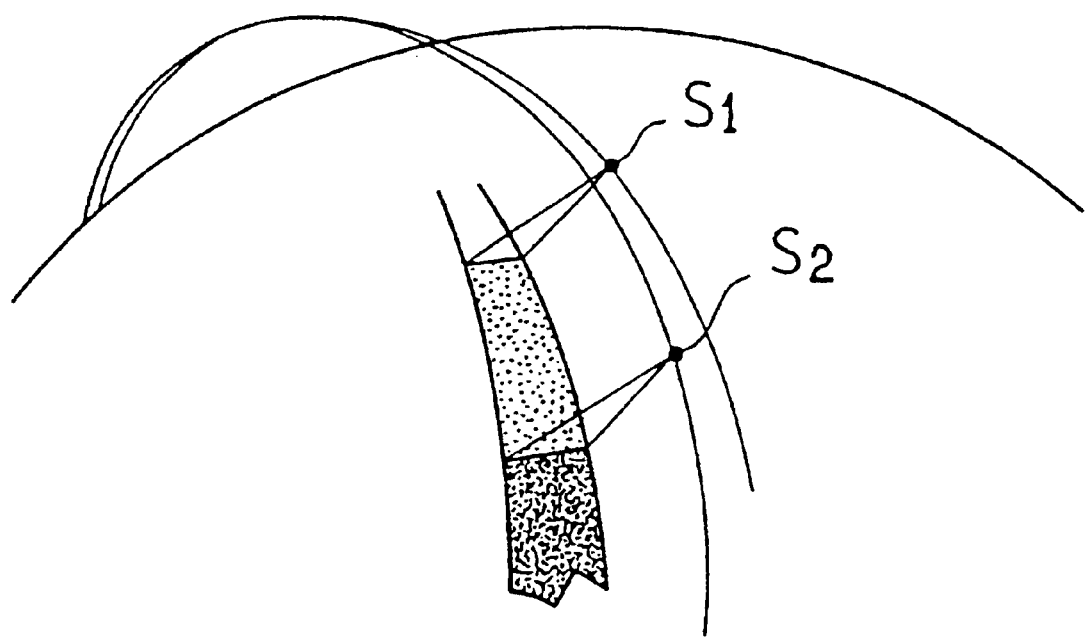

SATELLITE METHOD FOR USING RADAR INTERFEROMETRY TO ESTABLISH A DIGITAL TERRAIN MODEL

BACKGROUND OF THE INVENTION

1. Field of the Invention

The invention relates to a satellite method and system that are simple, reliable, and effective in establishing a digital terrain model (DTM) of all or part of the globe at very high resolution.

2. Background of the Invention

The invention is based on using high resolution radar imaging which presents known advantages (all weather, absolute localization, . . . ) and the technique of interferometry which also presents well-known advantages (very high accuracy, ease of implementation) but which usually suffers from limitations that cannot be overcome: phase noise introduced by microwave propagation through the atmosphere and the ionosphere, loss of coherence on vegetation and on large items in relief.

The invention seeks to eliminate these limitations completely and make it possible to achieve horizontal and vertical resolution of smaller than 5 meters (m), e.g. 2 m horizontally and 0.5 m vertically, or even smaller.

These high resolutions, combined with absolute localization, open the way to advantageous applications in world map-making and in topography.

Satellite systems have already been proposed to use radar interferometry to establish a digital terrain model of all or part of the globe, such a system being constituted by two satellites flying in formation on two close orbits and provided with respective synthetic aperture radars, as described for example in the article "Interférométrie Radar: Principe, Applications et Limitations" [Radar interferometry: principles, applications, and limitations] by Frédéric Adragna (December 1977), and in the article "Mapping the world's topography using radar interferometry: the Topsar mission" by Howard A. Zebker et al., (IEEE Proceedings, Vol. 82, No. 12, December 1994).

SUMMARY OF THE INVENTION

The present invention seeks to define a satellite method and system using two satellites flying in formation, but not requiring any synchronization between the radar signals of the two satellites.

According to the invention, this is achieved by providing each satellite with a high resolution synthetic aperture radar, and causing the two satellites to orbit one behind the other so that their radars observe the same strip of ground independently of each other at an incidence of at least 40°, with a time interval between their respective observations of not more than 10 seconds, preferably of not more than 4 seconds and not less than 2 seconds.

The bottom limit of said time interval depends on the wavelength and the resolution of the radars.

Since the earth rotates during said time interval, there exists an (adjustable) lateral orbital offset.

This offset creates a small stereo effect which makes it possible to obtain the relief of the earth using the technique of interferometry.

The two satellites can advantageously include respective radar transceivers.

The two radars are preferably identical.

The angle of incidence of the observation is preferably set to an angle in the range 40° to 60°.

In a typical implementation, each imaging radar (on board a Proteus type platform) is simplified as much as possible: only one angle of incidence, an antenna which is fixed and passive and therefore light in weight (5 m×1 m, 50 kilograms (kg)), a single mode of operation, a simple form of sampling (BAQ2 coding: 2×2 bits per pixel), low power, but high resolution (2 m).

It is necessary to have good on-board memory capacity and an accurate navigation system (possibly self-contained), capable of monitoring orbital position (required accuracy: 50 m), and for fine playback of the orbit (necessary for absolute localization of the product).

The system is effective because the usual limitations of interferometry are eliminated:

the changes that normally take place on the ground are non-existent, except probably in the event of very heavy rain and windy days over a forest (which can be detected by loss of coherence);

the refractive index of the atmosphere does not vary during this very short time period, except under exceptional weather conditions (probability of less than 10 minutes per year); and the high resolution (wide passband) combined with the high angle of incidence makes it possible to avoid problems of loss of coherence on mountainous zones (slopes).

The ambiguity altitude will depend on the spacing selected between the orbits, and can easily be modified over the lifetime of the system, as a function of requirements in terms of altitude measurement accuracy.

The invention presents advantages that are very great because:

very coherent interferograms of high resolution are obtained that can be converted automatically into elevation;

using acquisition in up orbits and in down orbits makes it possible to locate the final product absolutely in three dimensions without using external reference points (no operators).

Finally, the "coherence" of the interferogram serves to characterize the type of ground being observed (and to detect zones in which interferometric measurement is not reliable):

coherence =0: sea, lake, river (detecting coast lines, . . . );

coherence low: violent wind or various kinds of problem (DTM not reliable: invalidated);

coherence medium: (back-scattering in bulk) forests, . . . ;

coherence good: low density vegetation cover, cities, . . . ;

coherence =100%: bare earth or close-cropped vegetation.

In addition to the conventional strong points of radar interferometry (algorithmically easy to implement, measurement reliability, absolute localization without external reference points, etc. . . . ), the system of the invention presents the following advantages:

The high resolution makes it possible to measure the heights of buildings or isolated trees. If the ambiguity altitude is well chosen (80 m–100 m), there is no need to scroll through fringes.

3D measurements in urban environments would appear to be possible in spite of multiple reflections and geometrical folding.

It suffices to perform acquisition in "spotlight" mode (by rocking the platform backwards and forwards) to be in exactly the same configuration as the American airborne IFSARE system having resolution of 2×0.7 m.

The advantage over conventional stereo is that there is no geometrical deformation between the two images.

Pixels can be put immediately into correspondence and altitude is given by phase information only.

Finally, by filtering the interferogram, it is possible to distinguish vertical portions from horizontal portions.

BRIEF DESCRIPTION OF THE DRAWING

The single FIGURE of drawing discloses two mini-satellites orbiting one behind the other in accordance with the invention of the present application.

DETAILED DESCRIPTION OF THE PREFERRED EMBODIMENTS

EXAMPLE

The system of the invention comprises two mini-satellites S1 and S2 the single FIGURE of drawing orbiting one behind the other, being spaced apart by a distance of about 15 kilometers (km) to 30 km (about 2 seconds (s) to 4 s).

Accuracy relating to track is smaller than or equal to 50 m, which does not present any difficulty. b Since the orbit must be played back as finely as possible, the satellites carry accurate navigation systems (GPS, Doris, . . . ).

The satellites are fitted with identical radar transceivers.

To simplify the ground segment, it is possible to envisage autonomous control of the satellites.

Finally, it is desirable for the satellite platforms to be designed so as to be capable of varying the angle of incidence and to authorize mode (rocking forwards and backwards) locally (for urban 3D).

Altitude: 500 km.

Viewing angle of incidence: 50° (to avoid layovers with any shadow zones being filled in by cross-checking between up orbits and down orbits).

Antenna length: 5 m×1 m (X) or 5 m×2 m (C).

Wavelength: X band (or C band for better coherence).

Radiated power: about 4 kilowatts (kW) peak (Neσ0≈−18 decibels (dB)).

Mean power consumption: about 1500 watts (a few minutes per orbit).

Image resolution: 2 m×2 m (monoview); 2 m×0.5 m (spotlight).

Coding of raw radar data: $BAQ_2$: 2×2 bits/pixel (Magellan type).

Swath: 50 km (associated with the desired bandwidth and with the available data rate).

Instrument data rate after encoding: 350 megabits per second (Mbits/s).

Telemetry data rate: 200 Mbits/s (one satellite after the other).

Orbit: heliosynchronous of the 6:00 AM–6:00 PM type (maximizing energy and simplifying the platform).

The invention is not limited to this example.

What is claim is:

1. A method of using radar interferometry to establish a digital terrain model of very high resolution for all or part of the terrestrial globe, by means of two satellites (S1, S2) flying in formation on two orbits that are close and provided with respective radars, the method comprising providing each satellite with a high resolution synthetic aperture radar, and causing the two satellites to orbit one behind the other at a time interval, each satellite radar observing the same strip of ground independently of the radar in the other satellite at an incidence of at least 40°, with the time interval of not more than 10 seconds between the respective independent observations.

2. A method according to claim 1, in which said time interval is not more than 4 seconds.

3. A method according to claim 1, in which said time interval is not less than 2 seconds.

4. A method according to claim 1, in which angle of incidence is set to an angle in the range 40° to 60°.

5. A method according to claim 1, in which each satellite (S1, S2) is provided with a respective radar transceiver.

6. A method according to claim 1, in which both satellites are provided with identical radars.

7. A satellite system for implementing a method according to claim 1, characterized in that it comprises two satellites (S1, S2) fitted with respective high resolution synthetic aperture radars, adjusted to observe a common strip of terrain independently of each other at an angle of incidence of at least 40°, the satellites being programmed so that the radars observe the same strip of terrain at a time interval of not more than 10 seconds and not less than 2 seconds.

8. A satellite system according to claim 7, in which each radar is a transceiver.

9. A satellite system according to claim 8, in which both radars are identical.

* * * * *

UNITED STATES PATENT AND TRADEMARK OFFICE
CERTIFICATE OF CORRECTION

PATENT NO. : 6,552,678 B1
DATED : April 22, 2003
INVENTOR(S) : Frederic Adragna

It is certified that error appears in the above-identified patent and that said Letters Patent is hereby corrected as shown below:

Column 3,
Line 23, before "the" insert -- ( --.
Line 23, after "drawing" insert -- ) --.
Line 27, delete "b".

Column 4,
Line 31, after "which" insert -- the observation --.

Signed and Sealed this

First Day of July, 2003

JAMES E. ROGAN
*Director of the United States Patent and Trademark Office*